(12) United States Patent
Yang

(10) Patent No.: US 12,362,807 B2
(45) Date of Patent: Jul. 15, 2025

(54) BEAM PROCESSING METHOD AND APPARATUS AND COMMUNICATION DEVICE

(71) Applicant: VIVO MOBILE COMMUNICATION CO., LTD., Guangdong (CN)

(72) Inventor: Ang Yang, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 210 days.

(21) Appl. No.: 18/318,605

(22) Filed: May 16, 2023

(65) Prior Publication Data

US 2023/0291458 A1    Sep. 14, 2023

Related U.S. Application Data

(63) Continuation of application No. PCT/CN2021/131436, filed on Nov. 18, 2021.

(30) Foreign Application Priority Data

Nov. 23, 2020  (CN) ......................... 202011325594.5

(51) Int. Cl.
   *H04B 7/06*    (2006.01)
(52) U.S. Cl.
   CPC ......... *H04B 7/0639* (2013.01); *H04B 7/0632* (2013.01)
(58) Field of Classification Search
   CPC ............... H04B 7/0639; H04B 7/0632; H04B 7/06956; H04B 7/06964; H04B 7/06952; H04B 7/0408; G06N 3/045; G06N 3/084; H04W 24/02; H04W 24/10; H04W 48/16; H04W 72/046; H04W 72/542
   See application file for complete search history.

(56) References Cited

U.S. PATENT DOCUMENTS

| | | | |
|---|---|---|---|
| 2019/0199432 A1 | 6/2019 | Bosshard et al. | |
| 2019/0230529 A1 | 7/2019 | Sadiq et al. | |
| 2019/0349062 A1 | 11/2019 | Zhang et al. | |
| 2020/0022010 A1 | 1/2020 | Kim et al. | |
| 2020/0077285 A1 | 3/2020 | Yu et al. | |
| 2021/0058999 A1 | 2/2021 | Chen et al. | |
| 2023/0262506 A1 | 8/2023 | Yang | |

FOREIGN PATENT DOCUMENTS

| | | |
|---|---|---|
| CN | 110011709 A | 7/2019 |
| CN | 110475337 A | 11/2019 |
| CN | 110875770 A | 3/2020 |
| CN | 114390580 A | 4/2022 |

(Continued)

OTHER PUBLICATIONS

Guangdong OPPO Mobile Telecom., "Beam association relationship between data and control channels," 3GPP TSG RAN WG1 NR-Adhoc, R1-1700549, (Jan. 16-20, 2017).

(Continued)

*Primary Examiner* — Vineeta S Panwalkar
(74) *Attorney, Agent, or Firm* — Price Heneveld LLP

(57) ABSTRACT

This application discloses a beam processing method and apparatus, and a communication device, which belong to the field of communication technologies. The method includes: obtaining quality information of a first beam; and determining quality information of a second beam according to the quality information of the first beam.

20 Claims, 4 Drawing Sheets

(56) References Cited

FOREIGN PATENT DOCUMENTS

| WO | 2018/120566 A1 | 7/2018 |
| WO | 2018120102 A1 | 7/2018 |
| WO | 2019/231289 A1 | 12/2019 |

OTHER PUBLICATIONS

International Search Report and Written Opinion of the International Searching Authority dated Jan. 30, 2022 as received In Application No. PCT/CN2021/131436.

Samsung, "Remaining Details on QCL," 3GPP TSG RAN WG1 #91, R1-1720315, Nov. 27-Dec. 1, 2017, Reno, United States of America, 11 pages.

BEAM PROCESSING METHOD AND APPARATUS AND COMMUNICATION DEVICE

CROSS-REFERENCE TO RELATED APPLICATIONS

This application is a continuation application of International Application No. PCT/CN2021/131436 filed on Nov. 18, 2021, which claims priority to Chinese Patent Application No. 202011325594.5, filed in China on Nov. 23, 2020, the entire content of which is herein incorporated by reference.

TECHNICAL FIELD

This application belongs to the field of communication technologies, and specifically, to a beam processing method and apparatus and a communication device.

BACKGROUND

Current communication technologies are all based on a measurement manner of a single beam, that is, measurement and use are based on a same beam. For example, there are 32 transmitting beams on a network side and 16 receiving beams on a terminal side, then, there are 32*16=512 beam pairs in total. Therefore, if a terminal or a network-side device needs to obtain detailed beam information, it will cause a relatively large resource overhead.

SUMMARY

Embodiments of this application provide a beam processing method and apparatus, and a communication device.

According to a first aspect, a beam processing method is provided, performed by a first communication device, and the method including: obtaining quality information of a first beam; and determining quality information of a second beam according to the quality information of the first beam.

According to a second aspect, a beam processing apparatus is provided, including: an obtaining module, configured to obtain quality information of a first beam; and a determining module, configured to determine quality information of a second beam according to the quality information of the first beam.

According to a third aspect, a communication device is provided, including a processor, a memory, and a program or an instruction stored in the memory and executable on the processor, where the program or instruction, when executed by the processor, implements the steps of the method according to the first aspect.

According to a fourth aspect, a readable storage medium is provided, storing a program or instruction, where the program or instruction, when executed by a processor, implements the steps of the method according to the first aspect.

According to a fifth aspect, a chip is provided, including a processor and a communication interface, where the communication interface is coupled to the processor, and the processor is configured to run a program or instruction on a network-side device to implement the method according to the first aspect.

According to a sixth aspect, a computer program product is provided, being stored in a non-volatile storage medium, where the computer program product, when executed by at least one processor, implements the method according to the first aspect.

In the embodiments of this application, after the quality information of the first beam is obtained, the quality information of the second beam may be determined according to the quality information of the first beam. In this way, in a case of a large number of beams, quality information of another part of beams may be determined through quality information of some beams, thereby reducing the resource overhead, and resolving the problem of high resource consumption in the related art where obtaining the detailed beam information by the terminal or the network-side device becomes challenging in situations where a large number of beams are present.

DETAILED DESCRIPTION

The technical solutions in embodiments of this application are clearly described below with reference to the accompanying drawings in the embodiments of this application. Apparently, the described embodiments are merely some rather than all of the embodiments of this application. All other embodiments obtained by a person of ordinary skill in the art based on the embodiments of this application shall fall within the protection scope of this application.

In the specification and claims of this application, terms "first" and "second" are used to distinguish similar objects, but are not used to describe a specific sequence or order. It may be understood that the data used in such a way is interchangeable in proper circumstances, so that the embodiments of this application can be implemented in other sequences than the sequence illustrated or described herein. In addition, objects distinguished by "first" and "second" are usually of a type, and the quantity of objects is not limited. For example, a first object may be one or more than one. In addition, in the specification and claims, "and/or" means at least one of the connected objects, and the character "l" generally indicates an "or" relation between associated objects.

It should be noted that, the technology described in this embodiment of this application is not limited to a long term evolution (LTE)/LTE evolution (LTE-A) system, but may further be used in other wireless communication systems, such as code division multiple access (CDMA), time division multiple access (TDMA), frequency division multiple access (FDMA), orthogonal frequency division multiple access, (OFDMA), single-carrier frequency-division multiple access (SC-FDMA), and other systems. The terms "system" and "network" in this embodiment of this application are often used interchangeably, and the described technologies may be used both for the systems and radio technologies mentioned above and may also be used for other systems and radio technologies. The following descriptions describe a new radio (NR) system for the objective of being used as an example, and NR terms are used in most of the descriptions below. However, these technologies may also be applied to applications other than NR system applications, such as a 6th generation (6G) communication system.

Figure 1:
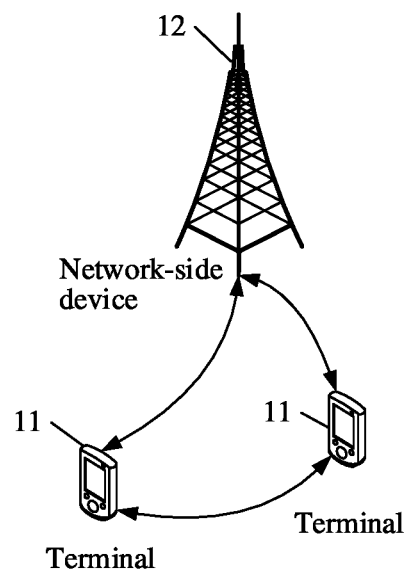
FIG. 1 is a block diagram of a wireless communication system to which an embodiment of this application may be applied.

FIG. 1 is a block diagram of a wireless communication system to which an embodiment of this application may be applied. The wireless communication system includes a terminal 11 and a network-side device 12. The terminal 11 may also be referred to as a terminal device or user equipment (UE). The terminal 11 may be a terminal-side device such as a mobile phone, a tablet personal computer, a laptop computer, or referred to as a notebook computer, a personal digital assistant (PDA), a palmtop computer, a netbook, an ultra-mobile personal computer (UMPC), a mobile Internet device (MID), a wearable device, or vehicle user equipment (VUE), and pedestrian user equipment, (PUE). The wearable device includes: a bracelet, headphones, glasses, or the like. It should be noted that in this embodiment of this application, a specific type of the terminal 11 is not limited. The network-side device 12 may be a base station or a core network, where the base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a household NodeB, a household evolved NodeB, a WLAN access point, a WiFi node, a transmission and reception point (TRP) or some other proper terms in the field. Provided that the same technical effect is achieved, the base station is not limited to a specific technical vocabulary. It is to be noted that in this embodiment of this application, only a base station in the NR system is used as an example, but a specific type of the base station is not limited.

The terms in this application will be described accordingly below.

1. Artificial Intelligence (AI)

Figure 2:
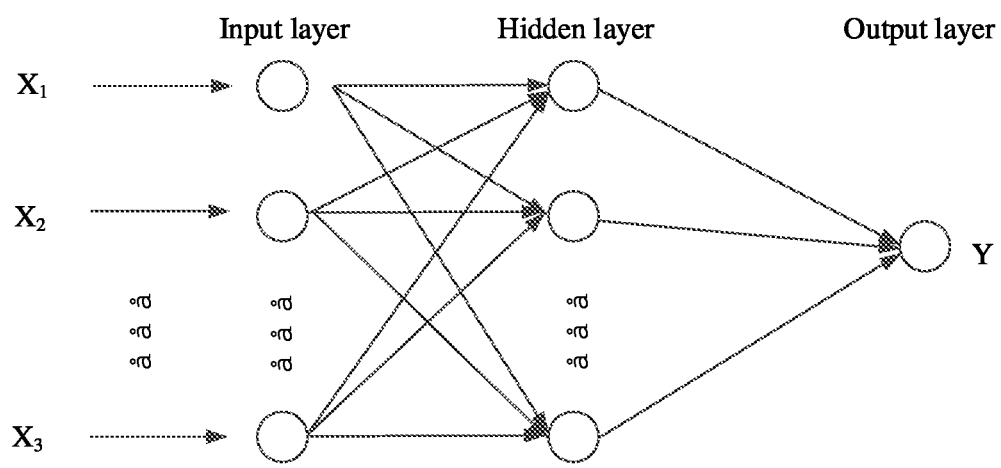
FIG. 2 is a schematic diagram of a neural network applicable to an embodiment of this application.
Figure 3:
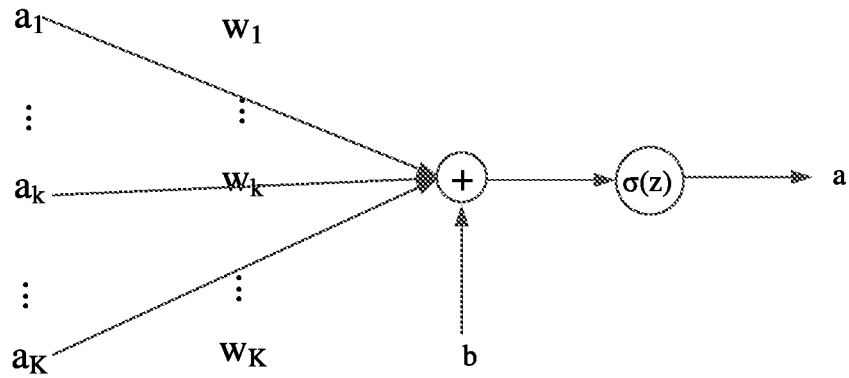
FIG. 3 is a schematic diagram of a neuron in a neural network according to an embodiment of this application.

Artificial intelligence is currently widely used in various fields. There are many manners to implement the AI, such as a neural network, a decision tree, a support vector machine, a Bayesian classifier, or the like. An example of a neural network is described in this application, but a specific type of an AI network is not limited. A neural network is as shown in FIG. 2, where the neural network includes neurons, and a schematic diagram of neurons is as shown in FIG. 3. a1, a2, . . . aK are inputs, w is a weight (a multiplicative coefficient), b is a bias (an additive coefficient), and σ(•) is an activation function; and common activation functions include Sigmoid, tanh, a rectified linear unit, a rectified linear unit (Rectified Linear Unit, ReLU), or the like.

A parameter of the neural network is optimized by an optimization algorithm, where the optimization algorithm is a type of algorithm that may help minimize or maximize an objective function (sometimes also referred to as a loss function). The objective function is often a mathematical combination of a model parameter and data. For example, given data X and a label Y corresponding to the data X, a neural network model f(·) is constructed. When there is a model, a predicted output f(x) may be obtained according to an input x, and a gap (f(x)—Y) between a predicted value and a real value may be calculated, which is the loss function. An objective is to find proper W and b to minimize a value of the loss function. The smaller the loss value, the closer the model is to a real condition.

Currently, a common optimization algorithm is basically based on an error back propagation (BP) algorithm. A basic idea of the BP algorithm is that a learning process includes two processes: forward propagation of a signal and back propagation of an error. During the forward propagation, input samples are transmitted from an input layer, processed layer by layer by each hidden layer, and transmitted to an output layer. If an actual output of the output layer does not match an expected output, a back propagation stage of an error is entered. The back propagation of the error is to back transmit an output error layer by layer from the hidden layer to the input layer in a specific form, and distribute the error to all units of each layer, so as to obtain an error signal of each layer unit. The error signal is used as basis for rectifying a weight of each unit. A weight adjustment process of each layer of the forward propagation of the signal and the back propagation of the error is repeatedly performed. A process of continuously adjusting the weight is also a learning and training process of the network. The process is performed until an error of a network output is reduced to an acceptable level, or until a preset quantity of learning times.

Common optimization algorithms include gradient descent (GD), stochastic gradient descent (SGD), mini-batch gradient descent, momentum, stochastic gradient descent with momentum (Nesterov), adaptive gradient descent (Adagrad), adaptive learning rate (Adadelta), root mean square prop (RMSprop), adaptive momentum estimation (Adam), or the like.

These optimization algorithms are errors/losses obtained according to the loss function during the back propagation of the error. The derivative/partial derivative of the current neuron is calculated, plus the effect of the learning rate and the previous gradient/derivative/partial derivative, a gradient is obtained, and the gradient is transmitted to a previous layer.

2. About Multi-Antenna

A wireless access technology standard such as long term evolution (LTE)/LTE-advanced (LTE-A) is constructed based on multiple-in multiple-out (MIMO)+an orthogonal frequency division multiplexing (OFDM) technology. The MIMO technology improves a peak rate and system spectrum utilization by using spatial freedom obtained by a multi-antenna system.

In a process of standardization development, dimensions of the MIMO technology continue to be expanded. In LTE Rel-8, a maximum of four layers of MIMO transmission may be supported. A multi-user MIMO (MU-MIMO) technology is enhanced in Rel-9, and MU-MIMO transmission of a transmission mode (TM)-8 may support a maximum of four downlink data layers. In Rel-10, a transmission capability of single-user MIMO (SU-MIMO) is expanded to a maximum of eight data layers.

The industry is further advancing the MIMO technology towards a three-dimensional and large-scale direction. Currently, 3GPP has completed a research project of 3D channel modeling, and is carrying out research and standardization work of eFD-MIMO and NR MIMO. It is foreseeable that in a future 5G mobile communication system, the MIMO technology with a larger scale and more antenna ports will be introduced.

The Massive MIMO technology uses a large-scale antenna array, which may greatly improve system frequency band utilization efficiency and support a larger quantity of access users. Therefore, various research organizations regard the massive MIMO technology as one of physical layer technologies with the greatest potential in a next generation mobile communication system.

In the massive MIMO technology, if all-digital arrays are used, a maximum spatial resolution and optimal MU-MIMO performance may be implemented. However, the structure requires a large quantity of AD/DA conversion devices and a large quantity of complete RF-baseband processing channels, which is a huge burden both in terms of device cost and baseband processing complexity.

To avoid the implementation cost and device complexity, a digital-analog hybrid beamforming technology comes into being. That is, based on traditional digital domain beamforming, a level of beamforming is added to a radio frequency signal close to a front end of an antenna system. Analog forming may implement a relatively rough match between a transmitted signal and a channel in a relatively simple manner. A dimension of an equivalent channel formed after the analog forming is less than an actual quantity of antennas. Therefore, subsequent required AD/DA conversion devices, a quantity of digital channels, and corresponding baseband processing complexity may be greatly reduced. A part of residual interference of the analog forming may be processed again in a digital domain, so as to ensure quality of MU-MIMO transmission. Compared with all-digital beamforming, digital-analog hybrid beamforming is a compromise between performance and complexity, and has a relatively high practical prospect in a system with a large bandwidth in a high frequency band or a large quantity of antennas.

3. About a High Frequency Band

In research on a next-generation communication system after 4G, an operating frequency band supported by the system is raised to above 6 GHz, and the highest is about 100 GHz. The high frequency band has relatively abundant idle frequency resources, which may provide a greater throughput for data transmission. Currently, 3GPP has completed the high-frequency channel modeling work. A wavelength of a high-frequency signal is short. Compared with a low-frequency band, the high-frequency signal may arrange more antenna elements on panels with the same size, and form beams with stronger directivity and narrower lobes by using the beamforming technology. Therefore, a combination of large-scale antennas and high-frequency communication is also one of the future trends.

4. About Beam Measurement and Beam Reporting

Analog beamforming is emitted in full bandwidth, and array elements in each polarization direction on a panel of each high-frequency antenna array may only transmit an analog beam in a time division multiplexing manner. A forming weight of the analog beam is implemented by adjusting a parameter of a device such as an RF front-end phase shifter, or the like.

Currently, in academia and industry, training of an analog beamforming vector is usually performed in a manner of polling. That is, array elements in each polarization direction of each antenna panel sequentially transmit training signals (that is, candidate beamforming vectors) at specified time in a time division multiplexing manner. After measurement, a terminal feeds back a beam report, so that a network side implements emitting of the analog beam by using the training signals when a service is transmitted next time. Content of the beam report usually includes several optimal identifiers of emitting beams and a measured receiving power of each emitting beam.

When performing beam measurement, the network configures a reference signal resource set (RS resource set), which includes at least one reference signal resource, such as an SSB resource or a CSI-RS resource. UE measures L1-RSRP/L1-SINR of each RS resource, and reports at least one optimal measurement result to the network. The reported content includes SSBRI or CRI, and L1-RSRP/L1-SINR. The reported content reflects at least one optimal beam and quality of the at least one optimal beam, and is used by the network to determine a beam used for transmitting a channel or signal to the UE.

5. About a Beam Indication Mechanism

After the beam measurement and beam reporting, the network may perform beam indication on channels or reference signals of a downlink link and an uplink link, which are used for establishing a beam link between the network and the UE, to implement transmission of the channels or reference signals.

For a beam indication of a physical downlink control channel (PDCCH), a network configures K transmission configuration indication (TCI) states for each control resource set CORESET by using radio resource control (RRC) signaling. When K>1, a media access control layer control unit (MAC CE) indicates or activates one TCI state, and when K=1, no additional MAC CE command is required. When the UE monitors the PDCCH, the UE uses the same quasi-colocation (QCL) for all search spaces in the CORESET, that is, monitors the PDCCH by using the same TCI state. A reference signal (RS) in the TCI state, such as a periodic channel state information reference signal (CSI-RS) resource, a semi-persistent CSI-RS resource, an SS block, or the like, and a UE-specific PDCCH DMRS port belong to spatial QCL. According to the TCI state, the UE may learn which receiving beam is used to receive the PDCCH.

For the beam indication of the PDSCH, the network configures M TCI states through the RRC signaling, then activates 2N TCI states by using the MAC CE command, and then notifies the TCI state through an N-bit TCI field of the DCI. An RS in the TCI state and a DMRS port of a to-be-scheduled PDSCH belong to the QCL. According to the TCI state, the UE may learn which receiving beam is used to receive the PDSCH.

For a beam indication of the CSI-RS, when a CSI-RS type is a periodic CSI-RS, the network configures QCL information for a CSI-RS resource through the RRC signaling. When the CSI-RS type is a semi-persistent CSI-RS, the network indicates QCL information when activating a CSI-RS resource from the CSI-RS resource set configured by the RRC through the MAC CE command. When the CSI-RS type is an aperiodic CSI-RS, the network configures the QCL for the CSI-RS resource through the RRC signaling, and triggers the CSI-RS by using the DCI.

For the beam indication of the PUCCH, the network configures spatial relation information for each PUCCH resource through a parameter PUCCH-SpatialRelationInfo by using the RRC signaling. When the spatial relation information configured for the physical uplink control channel (PUCCH) resource includes a plurality of pieces of spatial relation information, the MAC-CE is used for indicating or activating one of the pieces of spatial relation information. When the spatial relation information configured for the PUCCH resource includes only one piece of spatial relation information, no additional MAC CE command is required.

For the beam indication of the physical uplink shared channel (PUSCH), the spatial relation information of the PUSCH is that when the DCI carried by the PDCCH schedules the PUSCH, each SRI codepoint of an SRI field in the DCI indicates an SRI, and the SRI is used for indicating the spatial relation information of the PUSCH.

For a beam indication of an SRS, when an SRS type is a periodic SRS, the network configures the spatial relation information for an SRS resource through the RRC signaling. When the SRS type is a semi-persistent SRS, the network activates one from a set of spatial relation information configured by the RRC through the MAC CE command. When an SRS type is an aperiodic SRS, the network configures the spatial relation information for the SRS resource through the RRC signaling.

It is to be noted that meanings of beam information, spatial relation information, spatial domain transmission filter information, spatial filter information, TCI state information, QCL information, QCL parameters, spatial relation information, or the like involved in this application are similar.

Downlink beam information may usually be represented by the TCI state information and the QCL information. Uplink beam information may usually be represented by using the spatial relation information.

6. Beam Failure Recovery Mechanism

In a high-frequency communication system, due to a relatively short wavelength of a wireless signal, a condition that signal propagation is blocked is prone to occur, resulting in interruption of the signal propagation. If radio link reconstruction in the related art is used, it will take a relatively long time. Therefore, a beam failure recovery mechanism is introduced, and the mechanism is divided into the following four contents:

beam failure detection: a terminal measures a beam failure detection reference signal (BFD RS) at a physical layer, and determines whether a beam failure event occurs according to a measurement result. A determining condition is: if it is detected that a metric (hypothetical PDCCH BLER) of all serving beams meets a preset condition (exceeds a preset threshold), it is determined as a beam failure instance (BFI). A UE physical layer reports an indication to a UE higher layer (MAC layer). The reporting process is periodic. A BFI reporting period is the shortest period of a BFD RS, and a lower bound is 2 ms. Conversely, if the UE physical layer determines that no beam failure instance (BFI) occurs, no indication is transmitted to the higher layer. The UE higher layer counts the BFI reported by the physical layer by using a counter (counter) and a timer (timer). The timer (timer) is restarted every time the BFI is received, and the counter (counter) is counted again when the timer expires. When the counter reaches the maximum quantity of times configured by the network, the UE declares that a beam failure event occurs. In the related art, the timer and counter of the MAC layer of the UE are configured for each active BWP, and start and maintenance of the timer and counter on each BWP are independent, that is, the timer and counter of each BWP operate independently, including starting, resetting, counting, timing, or the like.

New candidate beam identification: a physical layer of the terminal measures a candidate beam reference signal (candidate beam RS) to find a new candidate beam. The step is not mandatory to be performed after the beam failure event occurs, and the step may also be performed before the beam failure even occurs. When receiving a request or an indication or a notification from the UE higher layer (MAC layer), the UE physical layer reports a measurement result that meets the preset condition (measurement L1-RSRP on the candidate beam RS (candidate beam RS) exceeds the preset threshold) to the UE higher layer. The report content is {beam RS index, L1-RSRP}, and the UE higher layer selects a candidate beam (candidate beam) based on reporting by the physical layer.

Beam failure recovery request (BFRQ): the UE higher layer (MAC layer) determines a PRACH resource according to a selected candidate beam. If the UE finds the candidate beam and configures a contention-free PRACH resource, the UE transmits the BFRQ to the base station by using the contention-free PRACH. Otherwise, the UE may use a contention-based PRACH resource. When the BFRQ expires, only the contention-based PRACH resource may be used. A total quantity of times two PRACH resources are used cannot exceed a preset value. The contention-free PRACH resource and other PRACH resources (such as the PRACH resource used for initial access) may be FDM or CDM. In addition, in the related art, the PUCCH is also supported in transmitting the BFRQ.

Beam failure recovery response (BFRR): after receiving the BFRQ, the base station transmits a response in a dedicated PDCCH on a configured CORESET-BFR, carries a cell-radio network temporary identifier (C-RNTI), and may further include handing over to a new candidate beam, or restarting beam search, or other indications. The CORESET-BFR and a downlink RS of the candidate beam found by the UE belong to the spatial QCL. If the beam failure recovery does not succeed, the UE physical layer transmits an indication to the UE higher layer for the higher layer to determine a subsequent radio link failure process.

For a multi-carrier scenario, such as carrier aggregation (CA), there are a plurality of carriers, or a plurality of component carriers CC, or a plurality of cells (cell), where there is a primary cell, such as a primary cell (PCell) in a master cell group (MCG), or a primary secondary cell (PSCell) in a secondary cell group (SCG) and at least one secondary cell (Scell).

The beam processing method provided in the embodiments of this application is described in detail below by using specific embodiments and application scenarios with reference to the accompanying drawings.

Figure 4:
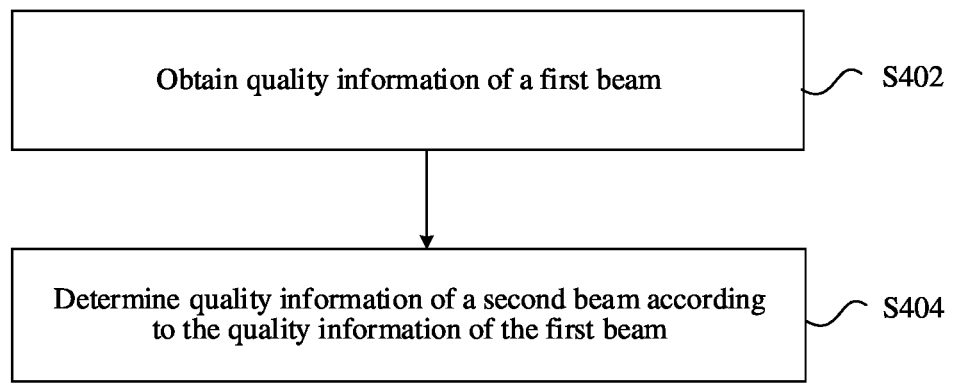
FIG. 4 is a flowchart of a beam processing method according to an embodiment of this application.

The embodiments of this application provide a beam processing method, performed by the first communication device. FIG. 4 is a flowchart of a beam processing method according to an embodiment of this application. As shown in FIG. 4, the steps of the method include:

step S402: obtaining quality information of a first beam; and step S404: determining quality information of a second beam according to the quality information of the first beam.

In the step S402 and step S404 in the embodiments of this application, after the quality information of the first beam is obtained, the quality information of the second beam may be determined according to the quality information of the first beam. In this way, in a case of many beams, quality information of another part of beams may be determined through quality information of some beams, thereby reducing the resource overhead, and resolving a problem in the related art that if the terminal or the network-side device needs to obtain the detailed beam information when there are many beams, it will cause the relatively large resource overhead.

In an optional implementation of the embodiments of this application, a manner of obtaining the quality information of the first beam involved in the step S402 in the embodiments of this application may further include:
- step S402-11: receiving configuration information transmitted by a second communication device, where the configuration information includes resource information of the first beam; and
- step S402-12: measuring the first beam according to the resource information of the first beam, to obtain the quality information of the first beam.

Based on this, a manner of determining the quality information of the second beam according to the quality information of the first beam involved in the step S404 in the embodiments of this application may be: determining the quality information of the second beam according to the quality information of the first beam and an association relation, where the association relation refers to an association relation between the first beam and the second beam.

In an optional implementation of the embodiments of this application, the association relation in the embodiments of this application is determined by at least one of the following:

1) the association relation between the first beam and the second beam carried in the configuration information; or
2) an association relation determined by indication information transmitted by the second communication device, where the indication information is used for indicating that a first artificial intelligence module is configured to determine the association relation, or is used for indicating a first artificial intelligence module selected by the second communication device from a plurality of artificial intelligence modules, or is used for indicating parameter information of a second artificial intelligence module, where the parameter information may include: an identifier of the artificial intelligence module, a type, an algorithm, and information of each element in the artificial intelligence module. For example, a neural network includes at least one of the following: a structure of the neural network, a quantity of layers, a quantity of neurons at a specific layer, a coefficient of a neuron (a multiplicative coefficient and/or an additive coefficient), an activation function, or the like.

In addition, the first artificial intelligence module determining the association relation refers to that an input of the first artificial intelligence module is at least one beam in the first beam, and an output of the first artificial intelligence module is at least one beam in the second beam, or an input of the first artificial intelligence module is at least one beam in the second beam, and an output of the first artificial intelligence module is at least one beam in the first beam.

Optionally, the input and/or output of the artificial intelligence module is an identifier of the beam, and/or a resource of the beam, and/or beamforming information of the beam, and/or beam quality of the beam.

3) An association relation is specified in a protocol.

The protocol may refer to specifying a specific association relation, or may refer to specifying in which manner the association relation is determined.

It is to be noted that the second beam in the embodiments of this application is a to-be-reported beam or a candidate beam. The candidate beam may be a specially configured candidate beam, or all available beams, or all configured available beams, or all possibly used beams, or all possibly reported beams.

It is to be noted that the first beam in the embodiments of this application includes at least one of the following: a measurement beam in beam training, a measurement beam in beam measurement, a beam in a beam report, a measurement beam in radio link monitoring (RLM), a measurement beam in radio resource management (RRM), or a measurement beam used for neighboring cell measurement; and based on this, the second beam in the embodiments of this application includes at least one of the following: a beam in a beam report, a beam in beam reference information, a beam in quasi co-location (QCL) information, a beam used for reflecting radio link performance, a beam in a corresponding report of the RRM, or a beam in a neighboring cell beam report.

The beam training includes at least one of the following: beam training of a layer 1 L1, or beam training of a layer 3 L3; and/or the beam measurement includes at least one of the following: beam measurement of L1, or beam measurement of L3; and/or the beam report includes at least one of the following: a beam report of L1, or a beam report of L3; and/or the beam reference information includes at least one of the following: beam reference information of a channel, or beam reference information of a signal; and/or the QCL information includes at least one of the following: QCL information of a channel, or QCL information of a signal.

Based on types of the first beam and the second beam, in a specific application scenario, the types of the first beam and the second beam may be:

a) in a case that the first beam is a measurement beam in L1 beam training and/or beam measurement, the second beam is a to-be-reported beam or a candidate beam in an L1 beam report;

b) in a case that the second beam is a measurement beam in L3 beam training and/or beam measurement, the second beam is a to-be-reported beam or a candidate beam in an L3 beam report;

c) in a case that the first beam is a measurement beam in L1/L3 beam training and/or beam measurement, or the first beam is a beam in an L1/L3 beam report, the first beam is a to-be-reported beam or a candidate beam in a channel and/or beam reference of a signal/QCL information.

The channel in the embodiments of this application includes at least one of the following: a physical downlink control channel (PDCCH), a physical downlink shared channel (PDSCH), a physical uplink control channel (PUCCH), a physical uplink shared channel (PUSCH), a physical random access channel (PRACH), or a physical broadcast channel (PBCH); and the signal in the embodiments of this application includes at least one of the following: a demodulation reference signal (DMRS), a channel sounding reference signal (SRS), a synchronization signal block (SSB), a tracking reference signal (TRS), a phase tracking reference signal (PTRS), or a channel state information reference signal (CSI-RS).

d) In a case that the first beam is a measurement beam in RRM, the second beam is a to-be-reported beam or a candidate beam in a corresponding report of the RRM, where a trigger condition of an event-triggered measurement behavior in the RRM is based on one of the following: beam quality of the first beam, or beam quality of the second beam. A trigger condition of an event-triggered reporting behavior in the RRM is based on one of the following: the beam quality of the first beam, or the beam quality of the second beam.

e) In a case that the first beam is the measurement beam in the RLM, the second beam is a beam reflecting performance of a radio link, for example, a beam determining whether a radio link is in-sync and/or out-of-sync and/or fails; or f) in a case that the first beam is a beam used for neighboring cell measurement (neighboring cell SSB and/or CSI-RS for mobility of the cell), the second beam is a to-be-reported beam or a candidate beam in a neighboring cell beam report, for example, the L1 beam report and/or the L3 beam report.

In another optional implementation of the embodiments of this application, the first beam may further include at least one of the following: a measurement beam of a synchronization signal block (SSB), a measurement beam of a system information block (SIB), a measurement beam of a first control resource set (CORESET), a beam that needs to be measured due to beam failure detection, or a beam that needs to be measured due to a new beam indication in a beam failure; and the second beam may further include at least one of the following: a beam used by a random access channel (RACH), a beam used for determining whether a beam failure occurs in the beam failure, or a newly selected beam in the beam failure.

Based on types of the first beam and the second beam, in a specific application scenario, the types of the first beam and the second beam in the embodiments of this application may further be:

g) in a case that the first beam is one of the following measurement beams: an SSB, an SIB, or CORESET #0, and the second beam is a candidate beam used by a random access channel (RACH), for example, a beam of the QCL information used for a channel such as a PRACH, a PDCCH, a PDSCH, or a PUSCH in an RACH stage.

i) In a case that the first beam is the beam that needs to be measured due to the new beam indication in the beam failure, the second beam is the newly selected beam in the beam failure. In a case that the first beam is the beam that needs to be measured due to the new beam indication in the beam failure, and the second beam is the newly selected beam in the beam failure, a beam reported by a physical layer to a higher layer is the first beam, or a beam reported by a physical layer to a higher layer is the second beam.

It is to be noted that the association relation configured by the first configuration information in the embodiments of this application may include at least one of the following:

1) a first association relation, where the first association relation refers to that the first beam is determined by a plurality of second beams in a first mathematical operation manner; and for the first mathematical operation manner, in a specific application scenario, for example, A1=(B1+B2+B3+B5)/4. A1 is the first beam of the first beam, and B1, B2, B3, and B5 are the $1^{st}$ $2^{nd}$, $3^{rd}$, and $5^{th}$ beams of the second beam respectively. It is to be noted that the first mathematical operation manner is only an example. In other application scenarios of the embodiments of this application, the first mathematical operation manner may be set correspondingly according to an actual condition.

It is to be noted that a relation between the first beam and the second beam may be configured by configuration information such as beam training/beam management/beam measurement/SIB/MIB/cell configuration information/physical cell configuration information/physical layer configuration information/higher layer configuration information, which may specifically include: an explicit relation and an implicit relation, where the explicit relation is to directly configure a relation or a coefficient of the second beam constituting the first beam. For example, the beam includes B1, B2, . . . , and B6 in total, A1=(B1+B2+B3+B5)/4, configuration 111010 or [0.25 0.25 0.25 0 0.25 0], configuration 111010 or [0.25 0.25 0.25 0 0.25 0], or configuration B1, B2, B3, and B5 (a possible configuration coefficient). The implicit relation is an association relation specified in a protocol or configured by the network.

2) A second association relation, where the second association relation refers to that the second beam is determined by a plurality of first beams through a second mathematical operation; and It is to be noted that a relation between the first beam and the second beam may be configured by configuration information such as beam training/beam management/beam measurement/SIB/MIB/cell configuration information/physical cell configuration information/physical layer configuration information/higher layer configuration information, which may specifically include: an explicit relation and an implicit relation, where the explicit relation is to directly report a relation or a coefficient of the second beam constituting the first beam. For example, the beam training includes A1, A2, . . . , and A6, B1=(A1+A2+A3+A5)/4, reporting 111010 or [0.25 0.25 0.25 0 0.25 0], or reporting A1, A2, A3, and A5 (a possible carrying coefficient). The implicit relation is an association relation specified in a protocol or configured by the network.

3) An association relation that the first beam is a subset of the second beam; and for example, the first beam is a subset of all beams, or the first beam is a subset of the second beam.

4) A third association relation, where the third association relation refers to that after at least one first beam is used as an input of an artificial intelligence network, an output of the artificial intelligence network is at least one second beam; and 5) a fourth association relation, where the fourth association relation refers to that after at least one second beam is used as an input of an artificial intelligence network, and an output of the artificial intelligence network is at least one first beam; and for the foregoing 4) and 5), the input of the AI network is at least one beam in the second beam, and the output of the AI network is at least one beam in the first beam. Alternatively, the input of the AI network is at least one beam in the first beam, and the output of the AI network is at least one beam in the second beams.

6) An association relation determined by beamforming information; and

It is to be noted that a manner in which the association relation is determined by the beamforming information includes at least one of the following: directly configuring the association relation through the beamforming information; determining the association relation through association between the beamforming information and the first beam and association between the beamforming information and the second beam; or deriving the association relation through the beamforming information.

It is to be noted that a manner of directly configuring the association relation through the beamforming information is a manner of directly specifying specific beamforming information of the beam, that is, the beamforming information is configured in the beam information. That is, a relation between the first beam and the second beam may be obtained through the beamforming information. For example, if a beamforming vector of each beam is already learned, the beamforming vector of the first beam may be combined with the beamforming vector of the second beam through a mathematical operation, or the beamforming vector of the second beam may be combined with the beamforming vector of the first beam through a mathematical operation.

A manner of determining the association relation through the association between the beamforming information and the first beam and the association between the beamforming information and the second beam, and a manner of deriving the association relation through the beamforming information are indirect manners, that is, configuration of the beamforming information is associated with the beam information. For example, N beamforming vectors are specified, indicating how the beam information is formed by these vectors.

7) A fifth association relation, where the fifth association relation is used for indicating that configuration information of the first beam and configuration information of the second beam are respectively configured in different lists.

In an optional implementation of the embodiments of this application, a plurality of antenna panels are arranged on the first communication device, and different beams or a same beam are/is used on each antenna panel. Optionally, in a case that the at least one first beam is used on each antenna panel, the second beam is formed through the plurality of antenna panels according to the association relation; and in a case that the at least one second beam is used on each antenna panel, the first beam is formed through the plurality of antenna panels according to the association relation.

In an optional implementation of the embodiments of this application, a digital-to-analog converter or an analog-to-digital converter or a radio frequency module is arranged on the first communication device, and the digital-to-analog converter or the analog-to-digital converter or the radio frequency module performs amplitude and/or phase mixing on at least one beam. Optionally, the digital-to-analog converter or the analog-to-digital converter or the radio frequency module combines the at least one first beam into the second beam according to the association relation; or the digital-to-analog converter or the analog-to-digital converter or the radio frequency module combines the at least one second beam into the first beam according to the association relation.

In an optional implementation of the embodiments of this application, a factor for determining the association relation includes at least one of the following: hardware information of the first communication device, analog beam selection, or a channel environment.

The hardware information includes at least one of the following: a beam-related parameter, an antenna-related parameter, or a processing capability-related parameter.

It is to be noted that the beam-related parameters includes at least one of the following: granularity of a supported analog beam, precision of a supported analog beam, an optional value of a supported analog beam, granularity of an element in an analog beamforming vector, precision of an element in an analog beamforming vector, an optional value of an element in an analog beamforming vector, granularity of an element in an analog beamforming vector, precision of an element in an analog beamforming vector, an optional value of an element in an analog beamforming vector, a quantity of beams combined into an analog beam, a quantity of supported analog beams, a quantity of main beam directions of an analog beam, precision of a digital-to-analog converter related to analog beamforming, a capability of a digital-to-analog converter related to analog beamforming, precision of an analog-to-digital converter related to analog beamforming, a capability of an analog-to-digital converter related to analog beamforming, precision of a radio frequency module related to analog beamforming, or a capability of a radio frequency module related to analog beamforming.

In addition, the antenna-related parameter includes at least one of the following: a quantity of antenna elements, a quantity of TXRUs, a quantity of antenna panels, distribution/a location of an antenna array, a beamforming capability (envelope) of an antenna array, distribution/a location of an antenna panel (such as how the antenna panel is placed in the UE, whether a specific panel is on the front, side, or back of a screen of the UE, and where is a specific location), or whether there is beam correspondence.

The processing capability-related parameter includes at least one of the following: a signal processing capability, a data computing capability, a storage capability, a central processing unit (CPU), a graphics processing unit (GPU), or a neural-network process unit (NPU). Optionally, the processing capability-related parameter of the network device, and/or the processing capability-related parameter of the terminal device is included.

The analog beam selection includes at least one of the following: a type of a specifically configured analog beam, precision of a specifically configured analog beam, a parameter of a specifically configured analog beam, a range of a specifically configured analog beam, a type of a selected analog beam, precision of a selected analog beam, a parameter of a selected analog beam, a range of a selected analog beam, a type of an available analog beam, precision of an available analog beam, a parameter of an available analog beam, or a range of an available analog beam. Optionally, analog beam selection for the network device, and/or analog beam selection for the terminal device is included.

In addition, the channel environment includes at least one of the following: a transmitting power, a noise power, an interference power, line-of-sight (LOS) transmission of a wireless signal, non-line-of-sight (NLOS) transmission of a wireless signal, latency information, a scattering condition, channel time variability, a movement speed of a terminal, a rotation speed of a terminal, a surrounding occlusion variation speed of a terminal, or an occlusion condition.

It is to be noted that in the beam processing method provided in the embodiments of this application, an execution entity may be a beam processing apparatus, or a control module configured to perform the beam processing method in the beam processing apparatus. In the embodiments of this application, the beam processing apparatus performing the beam processing method is used as an example to describe the beam processing apparatus provided in the embodiments of this application.

Figure 5:
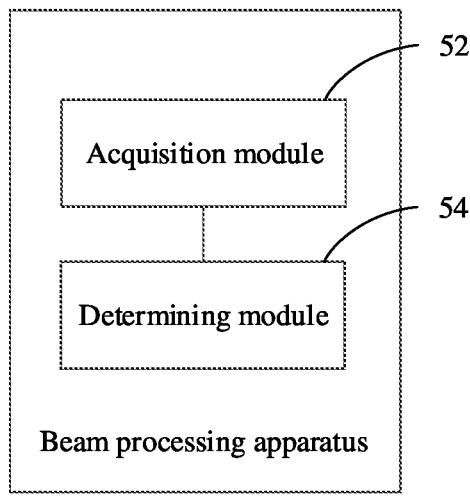
FIG. 5 is a schematic structural diagram of a processing apparatus according to an embodiment of this application.

The embodiments of this application provide a beam processing apparatus. As shown in FIG. 5, the apparatus includes:

an obtaining module 52, configured to obtain quality information of a first beam; and a determining module 54, configured to determine quality information of a second beam according to the quality information of the first beam.

In the embodiments of this application, after the quality information of the first beam is obtained, the quality information of the second beam may be determined according to the quality information of the first beam. In this way, in a case of many beams, quality information of another part of beams may be determined through quality information of some beams, thereby reducing the resource overhead, and resolving a problem in the related art that if the terminal or the network-side device needs to obtain the detailed beam information when there are many beams, it will cause the relatively large resource overhead.

Optionally, the obtaining module 52 in the embodiments of this application may further include: a receiving unit, configured to receive configuration information transmitted by a second communication device, where the configuration information includes resource information of the first beam; and a first measurement unit, configured to measure the first beam according to the resource information of the first beam, to obtain the quality information of the first beam.

Optionally, the determining module 54 in the embodiments of this application may further be configured to determine the quality information of the second beam according to the quality information of the first beam and an association relation, where the association relation refers to an association relation between the first beam and the second beam.

In an optional implementation of the embodiments of this application, the association relation in the embodiments of this application is determined by at least one of the following:

1) the association relation between the first beam and the second beam carried in the configuration information; or
2) an association relation determined by indication information transmitted by the second communication device, where the indication information is used for indicating that a first artificial intelligence module is configured to determine the association relation, or is used for indicating a first artificial intelligence module selected by the second communication device from a plurality of artificial intelligence modules, or is used for indicating parameter information of a second artificial intelligence module, where the first artificial intelligence module may be selected by the second communication device from a plurality of artificial intelligence modules. The parameter information of the second artificial intelligence module may also be selected from parameter information of a plurality of artificial intelligence modules. In addition, after indicating the parameter information of the second artificial intelligence module, the first communication device may directly determine the second artificial intelligence module through the parameter information, and then determine the association relation between the first beam and the second beam through the second artificial intelligence module.

3) An association relation is specified in a protocol.

Optionally, the first beam includes at least one of the following: a measurement beam in beam training, a measurement beam in beam measurement, a beam in a beam report, a measurement beam in radio link monitoring (RLM), a measurement beam in radio resource management (RRM), or a measurement beam used for neighboring cell measurement; and the second beam includes at least one of the following: a beam in a beam report, a beam in beam reference information, a beam in quasi co-location (QCL) information, a beam used for reflecting radio link performance, a beam in a corresponding report of the RRM, or a beam in a neighboring cell beam report.

Optionally, the beam training in the embodiments of this application includes at least one of the following: beam training of a layer 1 L1, or beam training of a layer 3 L3; and/or the beam measurement includes at least one of the following: beam measurement of L1, or beam measurement of L3; and/or the beam report includes at least one of the following: a beam report of L1, or a beam report of L3; and/or the beam reference information includes at least one of the following: beam reference information of a channel, or beam reference information of a signal; and/or the QCL information includes at least one of the following: QCL information of a channel, or QCL information of a signal.

Optionally, the channel in the embodiments of this application includes at least one of the following: a physical downlink control channel (PDCCH), a physical downlink shared channel (PDSCH), a physical uplink control channel (PUCCH), a physical uplink shared channel (PUSCH), a physical random access channel (PRACH), or a physical broadcast channel (PBCH); and Optionally, the signal in the embodiments of this application includes at least one of the following: a demodulation reference signal (DMRS), a channel sounding reference signal (SRS), a synchronization signal block (SSB), a tracking reference signal (TRS), a phase tracking reference signal (PTRS), or a channel state information reference signal (CSI-RS).

Optionally, a trigger condition of an event-triggered measurement behavior in the RRM in the embodiments of this application is based on one of the following: beam quality of the first beam, or beam quality of the second beam; and A trigger condition of an event-triggered reporting behavior in the RRM is based on one of the following: the beam quality of the first beam, or the beam quality of the second beam.

Optionally, the first beam in the embodiments of this application includes at least one of the following: a measurement beam of a synchronization signal block (SSB), a measurement beam of a system information block (SIB), a measurement beam of a first control resource set (CORESET), a beam that needs to be measured due to beam failure detection, or a beam that needs to be measured due to a new beam indication in a beam failure; and the second beam includes at least one of the following: a beam used by a random access channel (RACH), a beam used for determining whether a beam failure occurs in the beam failure, or a newly selected beam in the beam failure.

Optionally, the second beam in the embodiments of this application is a to-be-reported beam or a candidate beam.

Optionally, in a case that the first beam is the beam that needs to be measured due to the new beam indication in the beam failure, and the second beam is the newly selected beam in the beam failure, a beam reported by a physical layer to a higher layer is the first beam, or a beam reported by a physical layer to a higher layer is the second beam.

Optionally, the association relation in the embodiments of this application includes at least one of the following:

1) a first association relation, where the first association relation refers to that the first beam is determined by a plurality of second beams in a first mathematical operation manner; and
2) A second association relation, where the second association relation refers to that the second beam is determined by a plurality of first beams through a second mathematical operation; and
3) an association relation representing that the first beam is a subset of the second beam;
4) A third association relation, where the third association relation refers to that after at least one first beam is used as an input of an artificial intelligence network, an output of the artificial intelligence network is at least one second beam; and 5) a fourth association relation, where the fourth association relation refers to that after at least one second beam is used as an input of an artificial intelligence network, and an output of the artificial intelligence network is at least one first beam; and
6) An association relation determined by beamforming information; and
7) A fifth association relation, where the fifth association relation is used for indicating that configuration information of the first beam and configuration information of the second beam are respectively configured in different lists.

Optionally, the association relation in the embodiments of this application is determined by at least one of the following: direct configuration of the first communication device, specified in a protocol, network-side configuration, or terminal reporting.

Optionally, a manner in which the association relation is determined by the beamforming information in the embodiments of this application includes at least one of the following: directly configuring the association relation through the beamforming information; determining the association relation through association between the beamforming information and the first beam and association between the beamforming information and the second beam; or deriving the association relation through the beamforming information.

Optionally, a plurality of antenna panels are arranged on the first communication device in the embodiments of this application, and different beams or a same beam are/is used on each antenna panel; in a case that the at least one first beam is used on each antenna panel, the second beam is formed through the plurality of antenna panels according to the association relation; or in a case that the at least one second beam is used on each antenna panel, the first beam is formed through the plurality of antenna panels according to the association relation.

Optionally, a digital-to-analog converter or an analog-to-digital converter or a radio frequency module is arranged on the first communication device in the embodiments of this application, and the digital-to-analog converter or the analog-to-digital converter or the radio frequency module performs amplitude and/or phase mixing on at least one beam, where the digital-to-analog converter or the analog-to-digital converter or the radio frequency module combines the at least one first beam into the second beam according to the association relation; or the digital-to-analog converter or the analog-to-digital converter or the radio frequency module combines the at least one second beam into the first beam according to the association relation.

Optionally, in the embodiments of this application, a factor for determining the association relation includes at least one of the following: hardware information of the first communication device, analog beam selection, or a channel environment.

The hardware information includes at least one of the following: a beam-related parameter, an antenna-related parameter, or a processing capability-related parameter.

The beam-related parameters includes at least one of the following: granularity of a supported analog beam, precision of a supported analog beam, an optional value of a supported analog beam, granularity of an element in an analog beamforming vector, precision of an element in an analog beamforming vector, an optional value of an element in an analog beamforming vector, granularity of an element in an analog beamforming vector, precision of an element in an analog beamforming vector, an optional value of an element in an analog beamforming vector, a quantity of beams combined into an analog beam, a quantity of supported analog beams, a quantity of main beam directions of an analog beam, precision of a digital-to-analog converter related to analog beamforming, a capability of a digital-to-analog converter related to analog beamforming, precision of an analog-to-digital converter related to analog beamforming, a capability of an analog-to-digital converter related to analog beamforming, precision of a radio frequency module related to analog beamforming, or a capability of a radio frequency module related to analog beamforming.

Optionally, the channel environment includes at least one of the following: a transmitting power, a noise power, an interference power, line-of-sight (LOS) transmission of a wireless signal, non-line-of-sight (NLOS) transmission of a wireless signal, latency information, a scattering condition, channel time variability, a movement speed of a terminal, a rotation speed of a terminal, a surrounding occlusion variation speed of a terminal, or an occlusion condition.

The beam processing apparatus in the embodiments of this application may be an apparatus, and may also be a component in a terminal, an integrated circuit, or a chip. The apparatus may be a mobile terminal, or may be a non-mobile terminal. For example, the mobile terminal may include, but is not limited to, a type of the terminal 11 listed above, and a non-mobile terminal may be a server, a network attached storage (NAS), a personal computer (PC), a television (TV), a cash machine, a self-service machine, or the like, which is not specifically limited in this embodiment of this application.

The beam processing apparatus in the embodiments of this application may be an apparatus having an operating system. The operating system may be an Android operating system, may be an ios operating system, and may further be another possible operating system, which is not specifically limited in this embodiment of this application.

Figure 6:
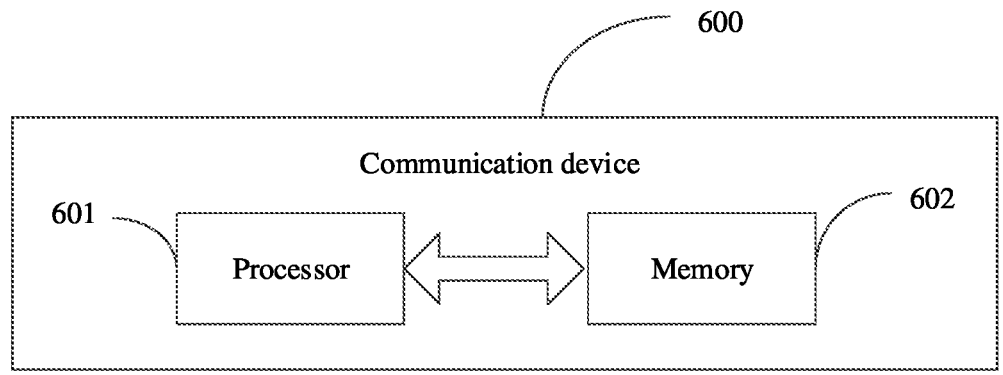
FIG. 6 is a schematic structural diagram of a communication device according to an embodiment of this application.

The beam processing apparatus provided in the embodiments of this application may implement various processes of the method embodiment in FIG. 6, and implement the same technical effect, which will not be described in detail herein again to avoid repetition.

Optionally, as shown in FIG. 6, the embodiments of this application further provide a communication device 600, including a processor 601, a memory 602, and a program or an instruction stored in the memory 602 and executable on the processor 601. For example, when the communication device 600 is a terminal, the program or instruction, when executed by the processor 601, implements various processes of the beam processing method embodiment, and may implement the same technical effect. When the communication device 600 is a network-side device, various processes of the beam processing method embodiment is implemented when the program or instruction is executed by the processor 601, and implement the same technical effect, which will not be described in detail herein again to avoid repetition.

Figure 7:
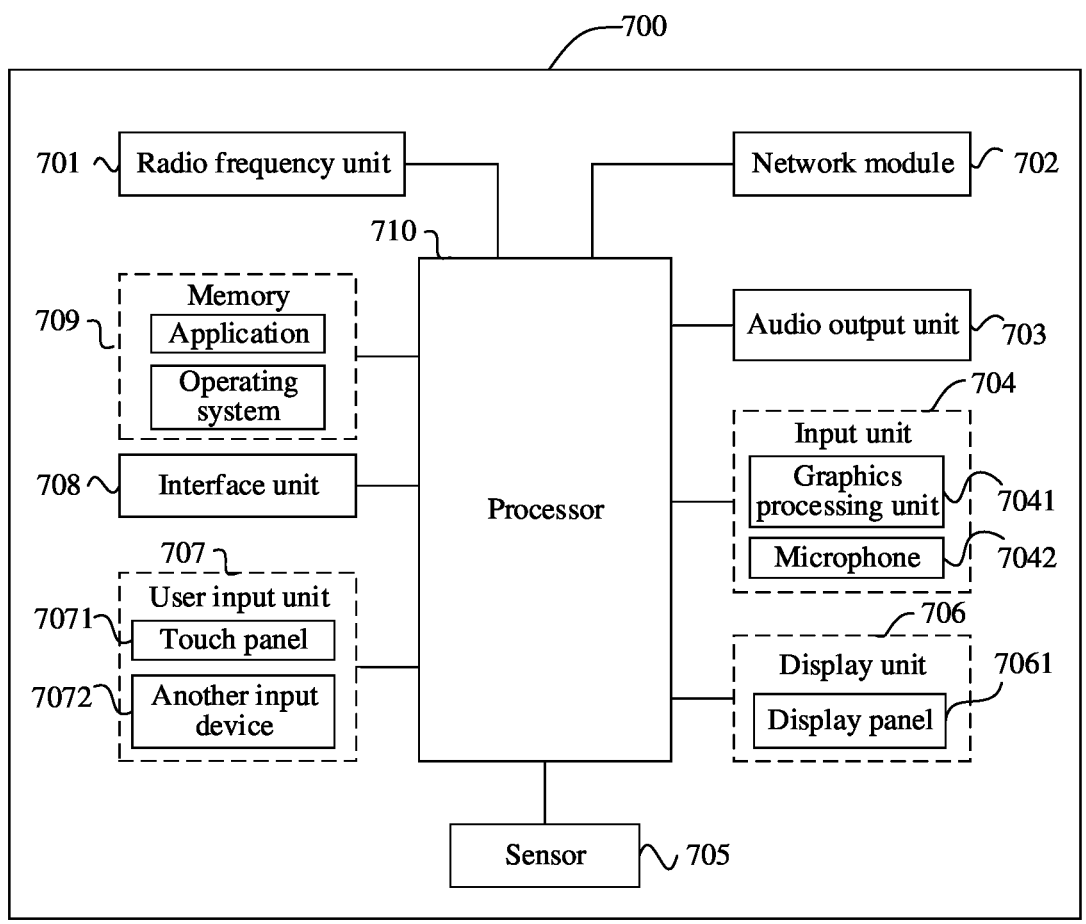
FIG. 7 is a schematic structural diagram of a terminal according to an embodiment of this application.

FIG. 7 is a schematic diagram of a hardware structure of a terminal according to an embodiment of this application.

The terminal 700 includes, but is not limited to, components such as a radio frequency unit 701, a network module 702, an audio output unit 703, an input unit 704, a sensor 705, a display unit 706, a user input unit 707, an interface unit 708, a memory 709, and a processor 710.

A person skilled in the art may understand that the terminal 700 may further include the power supply (such as a battery) for supplying power to the components. The power supply may be logically connected to the processor 710 by a power management system, thereby implementing functions such as charging, discharging, and power consumption management by using the power management system. A terminal structure shown in FIG. 7 does not constitute a limitation to the terminal, and the terminal may include more or fewer components than those shown in the figure, or some components may be combined, or a different component deployment may be used, and details are not repeated herein.

It should be understood that, in this embodiment of this application, the input unit 704 may include a graphics processing unit (GPU) 7041 and a microphone 7042. The graphics processing unit 7041 performs processing on image data of a static picture or a video that is obtained by an image acquisition apparatus (for example, a camera) in a video acquisition mode or an image acquisition mode. The display unit 706 may include a display panel 7061, and the display panel 7061 may be configured by using a liquid crystal display, an organic light-emitting diode, or the like. The user input unit 707 includes a touch panel 7071 and another input device 7072. The touch panel 7071 is also referred to as a touchscreen. The touch panel 7071 may include two parts: a touch detection apparatus and a touch controller. The another input device 7072 may include, but not limited to, a physical keyboard, a functional key (such as a volume control key or a switch key), a track ball, a mouse, and a joystick, which are not described herein in detail.

In this embodiment of this application, the radio frequency unit 701 receives downlink data from a network-side device and transmits the downlink data to the processor 710 for processing; and transmits uplink data to the network-side device. Generally, the radio frequency unit 701 includes, but is not limited to, an antenna, at least one amplifier, a transceiver, a coupler, a low noise amplifier, a duplexer, and the like.

The memory 709 may be configured to store a software program or an instruction and various data. The memory 709 may mainly include a program or an instruction storage area and a data storage area. The program or instruction storage area may store an operating system, an application program or instruction required by at least one function (such as a sound playback function and an image display function), and the like. In addition, the memory 709 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. Such as at least one magnetic disk storage device, a flash memory device, or other non-volatile solid-state storage devices.

The processor 710 may include one or more processing units; and optionally, the processor 710 may integrate an application processor and a modem processor. The application processor mainly processes an operating system, a user interface, an application program or instruction, and the like. The modem processor mainly processes wireless communication, such as a baseband processor. It may be understood that the foregoing modem processor may either not be integrated into the processor 710.

The processor 710 is configured to obtain quality information of a first beam, and determine quality information of a second beam according to the quality information of the first beam.

Optionally, a radio frequency module 701 is configured to receive first configuration information transmitted by a second communication device, where the first configuration information includes: an association relation between the first beam and the second beam and resource information of the first beam; and the processor 710 is configured to measure the first beam according to the resource information of the first beam, to obtain the quality information of the first beam.

Optionally, the radio frequency module 701 is further configured to receive second configuration information transmitted by a second communication device, where the configuration information includes: first indication information and resource information of the first beam; and the first indication information is used for indicating an association relation between the first beam and the second beam determined by an artificial intelligence module; and the processor 710 is further configured to measure the first beam according to the resource information of the first beam, to obtain the quality information of the first beam.

Optionally, the processor 710 is further configured to determine the quality information of the second beam according to the quality information of the first beam and an association relation.

In addition, the terminal in FIG. 7 in the embodiments of this application may further be configured to perform other method steps in the beam processing method in the embodiments of this application, which will not be repeated herein.

In network-side device in the embodiments of this application, after the quality information of the first beam is obtained, the quality information of the second beam may be determined according to the quality information of the first beam. In this way, in a case of many beams, quality information of another part of beams may be determined through quality information of some beams, thereby reducing the resource overhead, and resolving a problem in the related art that if the terminal or the network-side device needs to obtain the detailed beam information when there are many beams, it will cause the relatively large resource overhead.

Figure 8:
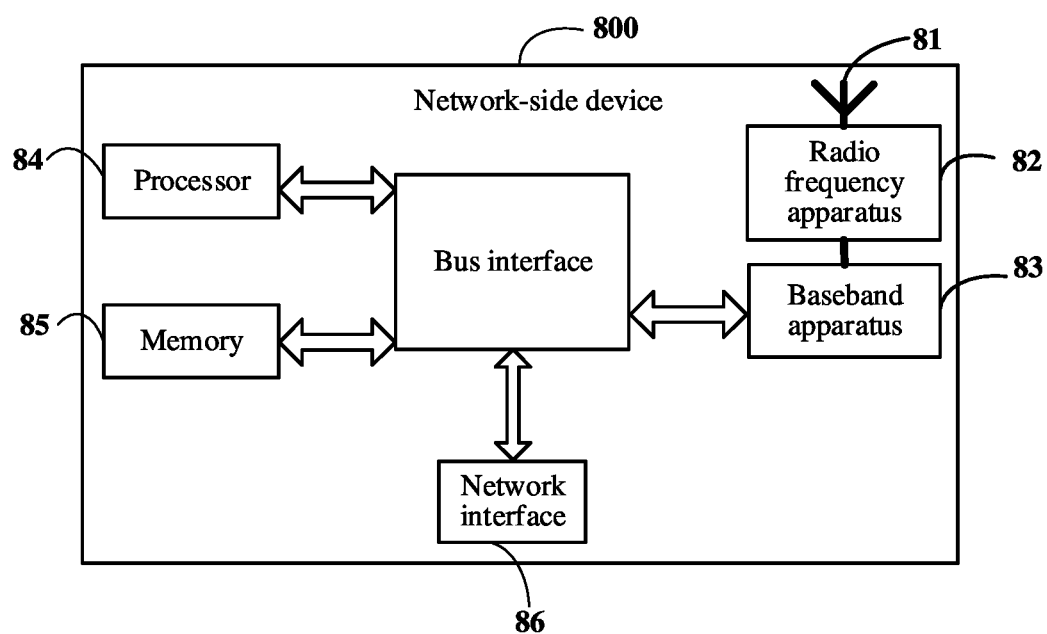
FIG. 8 is a schematic structural diagram of a network-side device according to an embodiment of this application.

Specifically, an embodiment of this application further provides a network-side device. As shown in FIG. 8, the network device 800 includes: an antenna 81, a radio frequency apparatus 82, and a baseband apparatus 83. The antenna 81 is connected to the radio frequency apparatus 82. In an uplink direction, the radio frequency apparatus 82 receives information through the antenna 81, and transmits the received information to the baseband apparatus 83 for processing. In a downlink direction, the baseband apparatus 83 performs processing on the to-be-transmitted information, and transmits the to-be-transmitted information to the radio frequency apparatus 82. After performing processing on the received information, the radio frequency apparatus 82 transmits the received information out through the antenna 81.

The frequency band processing apparatus may be located in the baseband apparatus 83, and the method performed by the network-side device in the foregoing embodiment may be implemented in the baseband apparatus 83. The baseband apparatus 83 includes a processor 84 and a memory 85.

The baseband apparatus 83 may include, for example, at least one baseband board, and a plurality of chips are arranged on the baseband board. As shown in FIG. 8, for example, one of the chips is a processor 84, and is connected to the memory 85, to invoke the program in the memory 85, and to perform the network device operation shown in the foregoing method embodiments.

The baseband apparatus 83 may further include a network interface 86 used for exchanging information with the radio frequency apparatus 82. For example, the interface is a common public radio interface (CPRI).

Specifically, the network-side device of this embodiment of this application further includes: an instruction or a program stored in the memory 85 and executable on the processor 84. The processor 84 invokes the instruction or program in the memory 85 to perform the method performed by each module shown in FIG. 4, and implements the same technical effect, which will not be described in detail herein again to avoid repetition.

The embodiments of this application further provide a readable storage medium storing therein a program or instruction. The program or instruction, when executed by a processor, implements various processes of the embodiments of the beam processing method, and may implement the same technical effect, which will not be described in detail herein again to avoid repetition.

The processor is a processor in the terminal described in the foregoing embodiment. The readable storage medium includes a computer-readable storage medium, for example, a Read-Only Memory (ROM), a Random Access Memory (RAM), a magnetic disk, an optical disc or the like.

The embodiments of this application further provide a chip. The chip includes a processor and a communication interface. The communication interface is coupled to the processor. The processor is configured to run a program or an instruction on a network-side device to implement various processes of the beam processing method embodiment, and may implement the same technical effect, which will not be described in detail herein again to avoid repetition.

It should be understood that the chip mentioned in this embodiment of this application may further be referred to as a system-level chip, a system chip, a chip system, a system on chip, or the like.

It is to be noted that the term "include", "comprise", or any other variation thereof in this specification intends to cover a non-exclusive inclusion, which specifies the presence of stated processes, methods, objects, or apparatuses, but does not preclude the presence or addition of one or more other processes, methods, objects, or apparatuses. Without more limitations, elements defined by the sentence "including one" does not exclude that there are still other same elements in the processes, methods, objects, or apparatuses. In addition, it should be noted that the scope of the methods and apparatuses in the implementations of this application is not limited to performing functions in the order shown or discussed, and may further include performing functions in a substantially simultaneous manner or in a reverse order according to the functions involved, for example, the described methods may be performed in an order different from the order described, and various steps may be added, omitted, or combined. In addition, features described with reference to some examples may be combined in other examples.

Through the foregoing description on the implementations, a person skilled in the art can clearly learn that the foregoing embodiment methods may be implemented by using software in combination with a necessary universal hardware platform. Certainly, the embodiment methods may also be implemented by using hardware, but the former is a better implementation in many cases. Based on such an understanding, the technical solutions of this application essentially, or the part contributing to the related art, may be presented in the form of a software product. The computer software product is stored in a storage medium (for example, a ROM/RAM, a magnetic disk, or an optical disc) including several instructions to enable a terminal (which may be a mobile phone, a computer, a server, an air conditioner, a network device, or the like) to perform the methods described in the embodiments of this application.

Although the embodiments of this application have been described above with reference to the accompanying drawings, this application is not limited to the specific implementations described above, and the specific implementations described above are merely exemplary and not limitative. A person of ordinary skill in the art may make various variations under the teaching of this application without departing from the spirit of this application and the protection scope of the claims, and such variations shall all fall within the protection scope of this application.

What is claimed is:

1. A beam processing method, performed by a first communication device, and the method comprising:
    obtaining quality information of a first beam; and
    determining quality information of a second beam according to the quality information of the first beam;
    wherein the obtaining quality information of the first beam comprises:
    receiving configuration information transmitted by a second communication device, wherein the configuration information comprises resource information of the first beam; and
    measuring the first beam according to the resource information of the first beam, to obtain the quality information of the first beam;
    wherein the determining quality information of the second beam according to the quality information of the first beam comprises:
    determining the quality information of the second beam according to the quality information of the first beam and an association relation, wherein the association relation refers to an association relation between the first beam and the second beam;
    wherein the association relation is determined by at least one of the following:
    the association relation between the first beam and the second beam carried in the configuration information;
    an association relation determined by indication information transmitted by the second communication device, wherein the indication information is used for indicating that a first artificial intelligence module is configured to determine the association relation, or is used for indicating a first artificial intelligence module selected by the second communication device from a plurality of artificial intelligence modules, or is used for indicating parameter information of a second artificial intelligence module; or
    an association relation specified in a protocol.

2. The method according to claim 1, wherein the first beam comprises at least one of the following: a measurement beam in beam training, a measurement beam in beam measurement, a beam in a beam report, a measurement beam in radio link monitoring (RLM), a measurement beam in radio resource management (RRM), or a measurement beam used for neighboring cell measurement; and
    the second beam comprises at least one of the following: a beam in a beam report, a beam in beam reference information, a beam in quasi co-location (QCL) information, a beam used for reflecting radio link performance, a beam in a corresponding report of the RRM, or a beam in a neighboring cell beam report.

3. The method according to claim 2, wherein the beam training comprises at least one of the following: beam training of a layer 1 L1, or beam training of a layer 3 L3; and/or
the beam measurement comprises at least one of the following: beam measurement of L1, or beam measurement of L3; and/or
the beam report comprises at least one of the following: a beam report of L1, or a beam report of L3; and/or
the beam reference information comprises at least one of the following: beam reference information of a channel, or beam reference information of a signal; and/or
the QCL information comprises at least one of the following: QCL information of a channel, or QCL information of a signal;
wherein the channel comprises at least one of the following: a physical downlink control channel (PDCCH), a physical downlink shared channel (PDSCH), a physical uplink control channel (PUCCH), a physical uplink shared channel (PUSCH), a physical random access channel (PRACH), or a physical broadcast channel (PBCH); and
the signal comprises at least one of the following: a demodulation reference signal (DMRS), a channel sounding reference signal (SRS), a synchronization signal block (SSB), a tracking reference signal (TRS), a phase tracking reference signal (PTRS), or a channel state information reference signal (CSI-RS); or,
a trigger condition of an event-triggered measurement behavior in the RRM is based on one of the following: beam quality of the first beam, or beam quality of the second beam; and
a trigger condition of an event-triggered reporting behavior in the RRM is based on one of the following: the beam quality of the first beam, or the beam quality of the second beam.

4. The method according to claim 1, wherein the first beam comprises at least one of the following: a measurement beam of a synchronization signal block (SSB), a measurement beam of a system information block (SIB), a measurement beam of a first control resource set (CORESET), a beam that needs to be measured due to beam failure detection, or a beam that needs to be measured due to a new beam indication in a beam failure; and
the second beam comprises at least one of the following: a beam used by a random access channel (RACH), a beam used for determining whether a beam failure occurs, or a newly selected beam in the beam failure that is different from existing beams of the first communication device.

5. The method according to claim 2, wherein the second beam is a to-be-reported beam or a candidate beam;
in a case that the first beam is the beam that needs to be measured due to the new beam indication in the beam failure, and the second beam is the newly selected beam in the beam failure, a beam reported by a physical layer to a higher layer is the first beam, or a beam reported by a physical layer to a higher layer is the second beam.

6. The method according to claim 1, wherein the association relation comprises at least one of the following:
a first association relation, wherein the first association relation refers to that the first beam is determined by a plurality of second beams in a first mathematical operation manner;
a second association relation, wherein the second association relation refers to that the second beam is determined by a plurality of first beams in a manner of a second mathematical operation;
an association relation representing that the first beam is a subset of the second beam;
a third association relation, wherein the third association relation refers to that after at least one first beam is used as an input of an artificial intelligence network, an output of the artificial intelligence network is at least one second beam;
a fourth association relation, wherein the fourth association relation refers to that after at least one second beam is used as an input of an artificial intelligence network, and an output of the artificial intelligence network is at least one first beam;
an association relation determined by beamforming information; or
a fifth association relation, wherein the fifth association relation is used for indicating that configuration information of the first beam and configuration information of the second beam are respectively configured in different lists.

7. The method according to claim 6, wherein a manner in which the association relation is determined by the beamforming information comprises at least one of the following:
directly configuring the association relation through the beamforming information;
determining the association relation through association between the beamforming information and the first beam and association between the beamforming information and the second beam; or
deriving the association relation through the beamforming information.

8. The method according to claim 6, wherein a plurality of antenna panels are arranged on the first communication device, and different beams or a same beam are/is used on each antenna panel;
wherein in a case that the at least one first beam is used on each antenna panel, the second beam is formed through the plurality of antenna panels according to the association relation; and
in a case that the at least one second beam is used on each antenna panel, the first beam is formed through the plurality of antenna panels according to the association relation.

9. The method according to claim 6, wherein a digital-to-analog converter or an analog-to-digital converter or a radio frequency module is arranged on the first communication device, and the digital-to-analog converter or the analog-to-digital converter or the radio frequency module performs amplitude and/or phase mixing on at least one beam;
wherein the digital-to-analog converter or the analog-to-digital converter or the radio frequency module combines the at least one first beam into the second beam according to the association relation; or
the digital-to-analog converter or the analog-to-digital converter or the radio frequency module combines the at least one second beam into the first beam according to the association relation.

10. The method according to claim 6, wherein a factor for determining the association relation comprises at least one of the following: hardware information of the first communication device, analog beam selection, or a channel environment;

wherein the hardware information comprises at least one of the following: a beam-related parameter, an antenna-related parameter, or a processing capability-related parameter;

wherein the beam-related parameters comprises at least one of the following: granularity of a supported analog beam, precision of a supported analog beam, an optional value of a supported analog beam, granularity of an element in an analog beamforming vector, precision of an element in an analog beamforming vector, an optional value of an element in an analog beamforming vector, granularity of an element in an analog beamforming vector, precision of an element in an analog beamforming vector, an optional value of an element in an analog beamforming vector, a quantity of beams combined into an analog beam, a quantity of supported analog beams, a quantity of main beam directions of an analog beam, precision of a digital-to-analog converter related to analog beamforming, a capability of a digital-to-analog converter related to analog beamforming, precision of an analog-to-digital converter related to analog beamforming, a capability of an analog-to-digital converter related to analog beamforming, precision of a radio frequency module related to analog beamforming, or a capability of a radio frequency module related to analog beamforming;

wherein the channel environment comprises at least one of the following: a transmitting power, a noise power, an interference power, line-of-sight (LOS) transmission of a wireless signal, non-line-of-sight (NLOS) transmission of a wireless signal, latency information, a scattering condition, channel time variability, a movement speed of a terminal, a rotation speed of a terminal, a surrounding occlusion variation speed of a terminal, or an occlusion condition.

11. A beam processing apparatus, comprising: a memory, a processor and a computer program stored in the memory and executable by the processor, wherein the processor executes the computer program to:

obtain quality information of a first beam; and determine quality information of a second beam according to the quality information of the first beam;

wherein the processor executes the computer program to receive configuration information transmitted by a second communication device, wherein the configuration information comprises resource information of the first beam; and measure the first beam according to the resource information of the first beam, to obtain the quality information of the first beam;

wherein the processor executes the computer program to determine the quality information of the second beam according to the quality information of the first beam and an association relation, wherein the association relation refers to an association relation between the first beam and the second beam;

wherein the association relation is determined by at least one of the following:

the association relation between the first beam and the second beam carried in the configuration information;

an association relation determined by indication information transmitted by the second communication device, wherein the indication information is used for indicating that a first artificial intelligence module is configured to determine the association relation, or is used for indicating a first artificial intelligence module selected by the second communication device from a plurality of artificial intelligence modules, or is used for indicating parameter information of a second artificial intelligence module; or an association relation specified in a protocol.

12. The apparatus according to claim 11, wherein the first beam comprises at least one of the following: a measurement beam in beam training, a measurement beam in beam measurement, a beam in a beam report, a measurement beam in radio link monitoring (RLM), a measurement beam in radio resource management (RRM), or a measurement beam used for neighboring cell measurement; and the second beam comprises at least one of the following: a beam in a beam report, a beam in beam reference information, a beam in quasi co-location (QCL) information, a beam used for reflecting radio link performance, a beam in a corresponding report of the RRM, or a beam in a neighboring cell beam report.

13. The apparatus according to claim 12, wherein the beam training comprises at least one of the following: beam training of a layer 1 L1, or beam training of a layer 3 L3; and/or the beam measurement comprises at least one of the following: beam measurement of L1, or beam measurement of L3; and/or the beam report comprises at least one of the following: a beam report of L1, or a beam report of L3; and/or the beam reference information comprises at least one of the following: beam reference information of a channel, or beam reference information of a signal; and/or the QCL information comprises at least one of the following: QCL information of a channel, or QCL information of a signal;

wherein the channel comprises at least one of the following: a physical downlink control channel (PDCCH), a physical downlink shared channel (PDSCH), a physical uplink control channel (PUCCH), a physical uplink shared channel (PUSCH), a physical random access channel (PRACH), or a physical broadcast channel (PBCH); and the signal comprises at least one of the following: a demodulation reference signal (DMRS), a channel sounding reference signal (SRS), a synchronization signal block (SSB), a tracking reference signal (TRS), a phase tracking reference signal (PTRS), or a channel state information reference signal (CSI-RS);

or, a trigger condition of an event-triggered measurement behavior in the RRM is based on one of the following: beam quality of the first beam, or beam quality of the second beam; and a trigger condition of an event-triggered reporting behavior in the RRM is based on one of the following: the beam quality of the first beam, or the beam quality of the second beam.

14. The apparatus according to claim 11, wherein the first beam comprises at least one of the following: a measurement beam of a synchronization signal block (SSB), a measurement beam of a system information block (SIB), a measurement beam of a first control resource set (CORESET), a beam that needs to be measured due to beam failure detection, or a beam that needs to be measured due to a new beam indication in a beam failure; and the second beam comprises at least one of the following: a beam used by a random access channel (RACH), a beam used for determining whether a beam failure occurs, or a newly selected beam in the beam failure that is different from existing beams of the first communication device.

15. The apparatus according to claim 12, wherein the second beam is a to-be-reported beam or a candidate beam; in a case that the first beam is the beam that needs to be measured due to the new beam indication in the beam failure, and the second beam is the newly selected beam in the beam failure, a beam reported by a physical layer to a higher layer is the first beam, or a beam reported by a physical layer to a higher layer is the second beam.

16. The apparatus according to claim 11, wherein the association relation comprises at least one of the following:
    a first association relation, wherein the first association relation refers to that the first beam is determined by a plurality of second beams in a first mathematical operation manner;
    a second association relation, wherein the second association relation refers to that the second beam is determined by a plurality of first beams in a manner of a second mathematical operation;
    an association relation representing that the first beam is a subset of the second beam;
    a third association relation, wherein the third association relation refers to that after at least one first beam is used as an input of an artificial intelligence network, an output of the artificial intelligence network is at least one second beam;
    a fourth association relation, wherein the fourth association relation refers to that after at least one second beam is used as an input of an artificial intelligence network, and an output of the artificial intelligence network is at least one first beam;
    an association relation determined by beamforming information; or
    a fifth association relation, wherein the fifth association relation is used for indicating that configuration information of the first beam and configuration information of the second beam are respectively configured in different lists.

17. The apparatus according to claim 16, wherein a manner in which the association relation is determined by the beamforming information comprises at least one of the following:
    directly configuring the association relation through the beamforming information;
    determining the association relation through association between the beamforming information and the first beam and association between the beamforming information and the second beam; or
    deriving the association relation through the beamforming information.

18. A non-transitory readable storage medium, storing a program or an instruction, wherein the program or instruction, when executed by a processor of a first communication device, implements:
    obtaining quality information of a first beam; and
    determining quality information of a second beam according to the quality information of the first beam;
    wherein the program or instruction, when executed by the processor of the first communication device, implements:
    determining the quality information of the second beam according to the quality information of the first beam and an association relation, wherein the association relation refers to an association relation between the first beam and the second beam;
    wherein the association relation is determined by at least one of the following:
    the association relation between the first beam and the second beam carried in the configuration information;
    an association relation determined by indication information transmitted by the second communication device, wherein the indication information is used for indicating that a first artificial intelligence module is configured to determine the association relation, or is used for indicating a first artificial intelligence module selected by the second communication device from a plurality of artificial intelligence modules, or is used for indicating parameter information of a second artificial intelligence module; or
    an association relation specified in a protocol.

19. The non-transitory readable storage medium according to claim 18, wherein the association relation comprises at least one of the following:
    a first association relation, wherein the first association relation refers to that the first beam is determined by a plurality of second beams in a first mathematical operation manner;
    a second association relation, wherein the second association relation refers to that the second beam is determined by a plurality of first beams in a manner of a second mathematical operation;
    an association relation representing that the first beam is a subset of the second beam;
    a third association relation, wherein the third association relation refers to that after at least one first beam is used as an input of an artificial intelligence network, an output of the artificial intelligence network is at least one second beam;
    a fourth association relation, wherein the fourth association relation refers to that after at least one second beam is used as an input of an artificial intelligence network, and an output of the artificial intelligence network is at least one first beam;
    an association relation determined by beamforming information; or
    a fifth association relation, wherein the fifth association relation is used for indicating that configuration information of the first beam and configuration information of the second beam are respectively configured in different lists.

20. The non-transitory readable storage medium according to claim 19, wherein a manner in which the association relation is determined by the beamforming information comprises at least one of the following:
    directly configuring the association relation through the beamforming information;
    determining the association relation through association between the beamforming information and the first beam and association between the beamforming information and the second beam; or
    deriving the association relation through the beamforming information.

* * * * *